United States Patent [19]
Kojima et al.

[11] Patent Number: 6,120,595
[45] Date of Patent: Sep. 19, 2000

[54] METHOD OF PRODUCING ACTIVATED CLAY FOR TREATING AROMATIC HYDROCARBONS

[75] Inventors: Seiji Kojima; Masashi Hatano; Hitoshi Yamamoto; Kiyohiko Imai, all of Chuo-ku, Japan

[73] Assignee: Mizusawa Industrial Chemicals, Ltd., Tokyo, Japan

[21] Appl. No.: 09/217,069

[22] Filed: Dec. 21, 1998

[30] Foreign Application Priority Data

Dec. 25, 1997 [JP] Japan .................................. 9-357800

[51] Int. Cl.⁷ .............................. C09C 1/42; C09C 1/02; B01J 21/16; B01J 20/12
[52] U.S. Cl. ........................ 106/486; 106/488; 502/81; 502/84; 502/85
[58] Field of Search .................................. 501/486, 488; 502/81, 83, 85, 408, 84

[56] References Cited

U.S. PATENT DOCUMENTS

| | | | |
|---|---|---|---|
| 3,617,215 | 11/1971 | Sugahara et al. | 502/81 |
| 3,787,330 | 1/1974 | Sugahara et al. | 502/81 |
| 3,857,866 | 12/1974 | Gibble et al. | 554/191 |
| 4,692,425 | 9/1987 | Schneider et al. | 502/81 |
| 5,008,226 | 4/1991 | Taylor et al. | 502/81 |
| 5,037,569 | 8/1991 | Salomon | 252/48.2 |
| 5,243,059 | 9/1993 | Ibuki et al. | 554/191 |
| 5,468,701 | 11/1995 | Nebergall et al. | 502/81 |

*Primary Examiner*—Michael Marcheschi
*Attorney, Agent, or Firm*—Sherman and Shalloway

[57] ABSTRACT

The present invention provides an activated clay for refining aromatic hydrocarbons such as BTX (benzene, toluene, xylene), etc., satisfying the requirements of both excellent life and excellent side-reaction-preventing property. The activated clay for treating aromatic hydrocarbons is obtained by treating dioctahedral smectite clay minerals with an acid so as to possess a BET specific surface area of not smaller than 250 m²/g and to contain iron in an amount of not smaller than 2.5% by weight calculated as $Fe_2O_3$.

8 Claims, 10 Drawing Sheets

METHOD OF PRODUCING ACTIVATED CLAY FOR TREATING AROMATIC HYDROCARBONS

BACKGROUND OF THE INVENTION

1. (Field of the Invention)

The present invention relates to activated clay for treating aromatic hydrocarbons. More specifically, the invention relates to activated clay used for refining aromatic hydrocarbons such as BTX (benzene, toluene, xylene) and the like, and having excellent life and excellent side-reaction-preventing property.

2. (Prior Art)

A solvent extraction method or the like method has heretofore been widely used for separating aromatic hydrocarbons such as benzene, toluene, xylene ($C_8$ aromatic group) and the like from the starting oils. The recovered aromatic hydrocarbons contain unsaturated compounds such as olefins and diolefins, and a refining treatment (polymerization of ethylenically unsaturated compounds) has been conducted to remove these unsaturated compounds by using the activated clay (Japanese Laid-Open Patent Publication No. 127931/1974).

Japanese Laid-Open Patent Publication No. 263431/1994 discloses a method of producing activated clay for the above-mentioned uses, comprising (a) bringing smectite clay particles into contact with an acid and washing the smectite clay particles with an excess amount of an acid to form the smectite clay particles that are once activated with the acid, (b) mixing the smectite clay particles that are once activated with an acid together with the water and an acid to form the smectite clay particles that are twice activated with the acid, (c) coagulating the smectite clay particles twice activated with the acid so as to form granules in which the smectite clay particles twice activated with the acid are bonded together, and (d) supplying again the granules that were not regenerated into the step of mixing for obtaining a coagulated product having a desired particle size distribution.

The activated clay is used for refining the aromatic hydrocarbons because of the reasons that olefins and diolefins contained in the aromatic hydrocarbons such as BTX are polymerized on the surfaces of the activated clay, and the double bonds decrease due to the polymerization causing the molecular weight to increase such as forming dimers and trimers, enabling them to be easily removed as high-boiling fractions of distillate by distillation. It has been considered that the polymerization takes place since solid acids in the activated clay work as a catalyst.

However, it has been known that the solid acids trigger the polymerization of unsaturated compounds, and further trigger the disproportionation reaction or the isomerization reaction of the alkyl aromatic compounds such as toluene, xylene, etc. It is therefore desired that the activated clay for refining the aromatic hydrocarbons do not cause such side reactions. It is further desired that the activated clay exhibits a long life for the polymerization of unsaturated compounds.

Among the conventional activated clay for treating aromatic hydrocarbons, however, those that exhibit a long life tend to cause side reactions such as disproportionation reaction, and those that little cause side reactions, generally, have a short life. There has not yet been known the activated clay that satisfies both the selectivity of reaction and long life.

SUMMARY OF THE INVENTION

It is therefore an object of the present invention to provide activated clay which is used for refining aromatic hydrocarbons such as BTX (benzene, toluene, xylene) and the like, exhibiting excellent life and excellent side-reaction-preventing property.

According to the present invention, there is provided activated clay for treating aromatic hydrocarbons, obtained by treating dioctahedral smectite clay minerals with an acid, and having a BET specific surface area of not smaller than 250 $m^2/g$ and containing an iron component in an amount of not smaller than 2.5% by weight calculated as $Fe_2O_3$.

The value of the $Fe_2O_3$ oxide appearing in this specification represents the iron component calculated as $Fe_2O_3$ oxide that is contained when 1 g of the starting clay or the activated clay is dried at 110° C. for 3 hours.

In the activated clay for treating aromatic hydrocarbons of the present invention, it is desired that:

1. an $SiO_2/Al_2O_3$ molar ratio is over a range of from 8.0 to 17.0, and an $SiO_2/Al_2O_3$ molar ratio is over a range of from 16.0 to 85.0;
2. at least part of the iron component exists in the form of a hydroxyl group-containing iron (III) compound;
3. the activated clay is the one obtained by treating, with an acid, the dioctahedral smectite clay minerals containing iron in an amount of from 5 to 25% by weight calculated as $Fe_2O_3$ so as to possess a BET specific surface area of not smaller than 250 $m^2/g$ and to contain iron in an amount of not smaller than 2.5% by weight calculated as $Fe_2O_3$;
4. an infrared ray absorption peak is exhibited at a wave number of from 890 to 860 $cm^{-1}$;
5. an endothermic peak is exhibited at 400 to 500° C. in the differential thermal analysis;
6. dioctahedral smectite clay minerals are treated with an acid until they possess a BET specific surface area of not smaller than 250 $m^2/g$ and, then, an aqueous solution of an iron salt is hydrolyzed in the presence of the acid-treated product thereof, so that an iron component is settled in an amount of not smaller than 0.5% by weight calculated as $Fe_2O_3$ and that the amount of the $Fe_2O_3$ oxide is not smaller than 2.5% by weight as a whole; and
7. in 6. above, at least part of the iron component is an iron salt expressed by the following formula, wherein M is an alkali metal.

DETAILED DESCRIPTION OF THE INVENTION

The present invention has a feature in that among the activated clay obtained by treating dioctahedral smectite clay minerals with an acid, there are selected those having BET specific surface areas of not smaller than 250 m²/g and, particularly, over a range of from 300 to 400 m²/g and having an iron content of not smaller than 2.5% by weight and, particularly, from 3 to 15% by weight calculated as $Fe_2O_3$, and these activated clay are used for the treatment of aromatic hydrocarbons.

According to the present invention, there are selected those activated clay that satisfy both the BET specific surface area and the amount of iron component, making it possible to offer an extended life as a catalyst in the treatment of aromatic hydrocarbons while drastically suppressing the side reactions such as disproportionation and isomerization of alkyl aromatic hydrocarbons.

In general, the activity and life of the activated clay for treating aromatic hydrocarbons is evaluated by passing the aromatic hydrocarbons through the granular clay-filled layer, removing high-boiling fractions of distillate by distillation, and by finding a bromine index which represents the content of olefin components.

Figure 1:
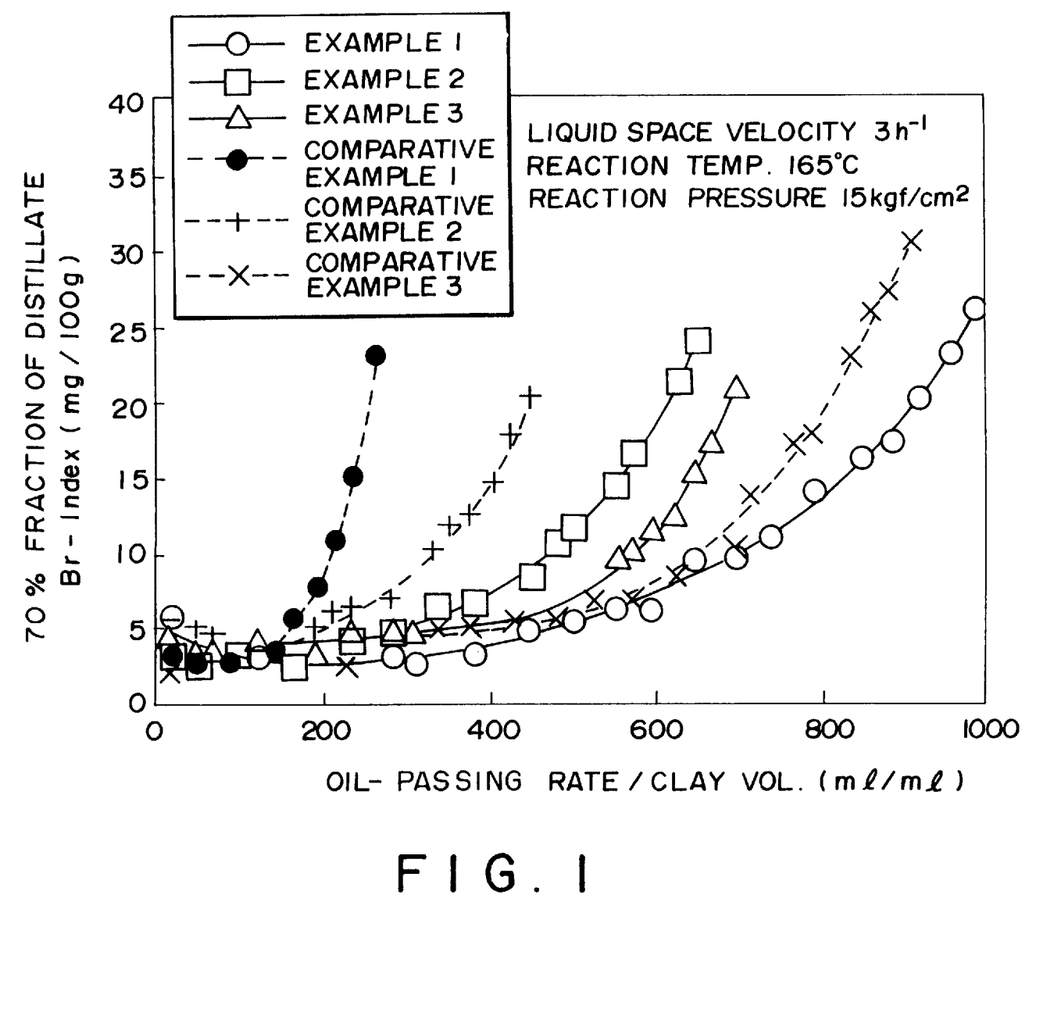
FIG. 1 is a diagram illustrating a relationship between the oil-passing rates and the bromine indexes in the 70% fraction of distillate recovered by distillation in Examples 1 to 3 and in Comparative Examples 1 to 3.

FIG. 1 in the accompanying drawings illustrates a relationship between the oil-passing rates and the bromine indexes in the 70% fraction of distillate recovered by distillation of various dioctahedral smectite clay minerals and the acid-treated products thereof. The life is extended as the rising position of the curve moves toward the right.

From the results of FIG. 1, the life of the catalyst varies depending upon the kind of the clay minerals or of the acid-treated product thereof, but it is obvious that the activated clay satisfying the requirements of the present invention exhibits excellent life.

The degree of side reaction and, particularly, of the disproportionation reaction of the activated clay for treating aromatic hydrocarbons can be evaluated by measuring the amount of toluene and the amount of benzene in the oil which has passed through the granular clay-filled layer and from which high-boiling fractions of distillate have been removed by distillation. That is, among the $C_8$ fractions of distillate, xylene causes a disproportionation into trimethylbenzene and toluene as represented by the following chemical formula (1)

and ethylbenzene causes a disproportionation into diethylbenzene and benzene as represented by the following chemical formula (2)

By measuring the amounts of toluene and benzene, therefore, it is allowed to know the degree of disproportionation.

Figure 2:
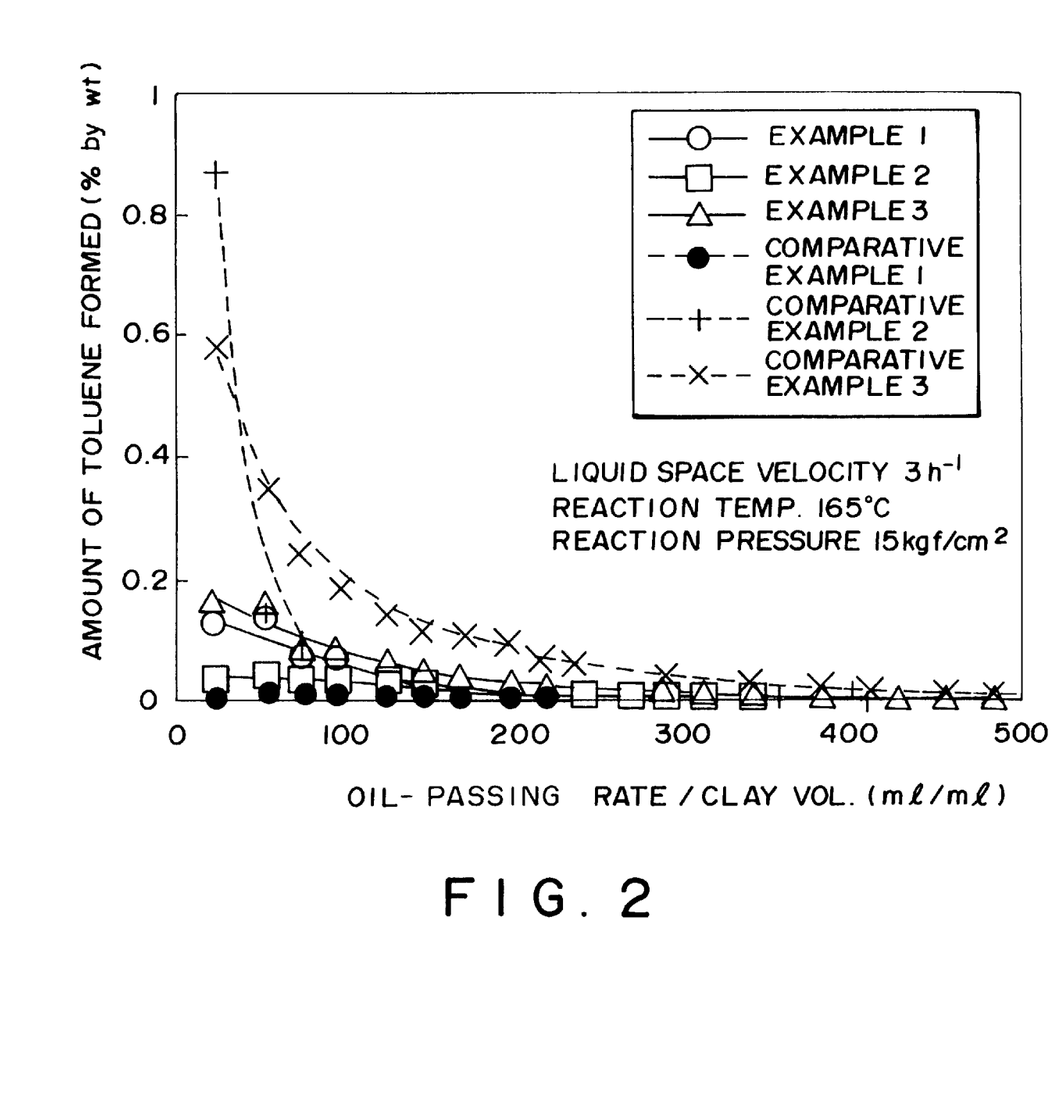
FIG. 2 is a diagram illustrating a relationship between the oil-passing rates and the amounts of toluene in the 70% fraction of distillate recovered by distillation in Examples 1 to 3 and in Comparative Examples 1 to 3.
Figure 3:
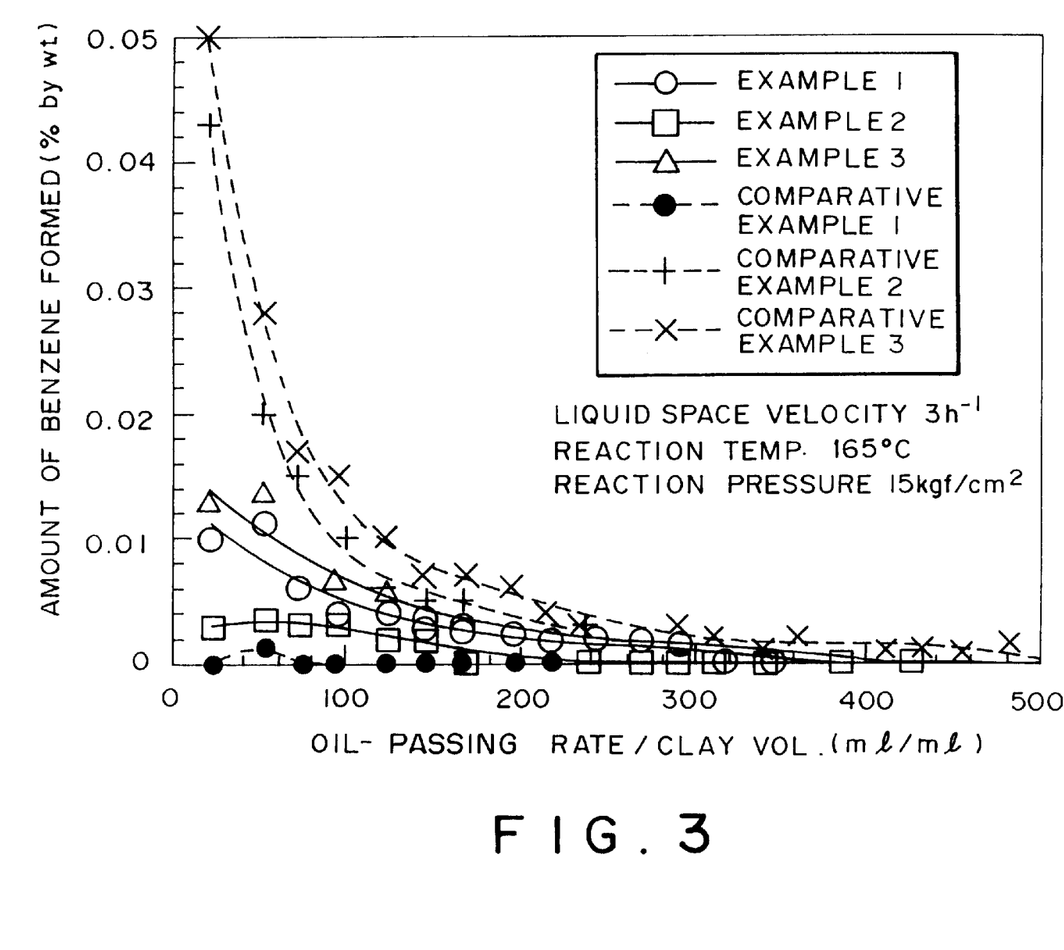
FIG. 3 is a diagram illustrating a relationship between the oil-passing rates and the amounts of benzene in the 70% fraction of distillate recovered by distillation in Examples 1 to 3 and in Comparative Examples 1 to 3.

FIGS. 2 and 3 in the accompanying drawings illustrate a relationship between the oil-passing rates and the amounts of toluene in the 70% fraction of distillate recovered by distillation and a relationship between the oil-passing rates and the amounts of benzene in the 70% fraction of distillate recovered by distillation of various dioctahedral smectite clay minerals and of acid-treated products thereof. The amounts of toluene and the amounts of benzene in the 70% fraction during the early stage of passage of the oil vary depending upon the clay minerals or the acid-treated products thereof. It is, however, obvious that the activated clay satisfying the requirements of the present invention suppresses the amounts of toluene that is formed and the amounts of benzene that is formed to low levels.

Furthermore, comparison of FIGS. 1, 2 and 3 indicate the following very interesting fact. That is, the known clay minerals and the acid-treated products thereof exhibiting long lives but lying outside the scope of the present invention, tend to develop disproportionation to a conspicuous degree in FIGS. 2 and 3. On the other hand, the clay minerals and the acid-treated products thereof that do not develop disproportionation in FIGS. 2 and 3, show short lives. In other words, there had been known no clay mineral or acid-treated product thereof satisfying the requirements of both the long life and the side-reaction-preventing property.

On the other hand, the activated clay satisfying both of the requirements of the present invention exhibits a long life as shown in FIG. 1 and suppresses the side reaction such as disproportionation to a very low level as shown in FIGS. 2 and 3. This is an unexpected effect accomplished by the present invention.

It should be also understood that both the above-mentioned high BET specific area and the large iron content cannot necessarily be easily accomplished in the activated clay used in the present invention.

The dioctahedral smectite is constituted by a laminated-layer structure having, as a basic layer unit, a three-layer structure in which an $AlO_6$ octahedral layer is sandwiched by two $SiO_4$ tetrahedral layers, Al in the $AlO_6$ octahedral layer is isomorphously substituted by Fe or Mg, and Si in the $SiO_4$ tetrahedral layer is isomorphously substituted by Al, the basic layer units being laminated in the direction of a c-axis, and metal cations existing among the layers to compensate for the lack of electric charge caused by the isomorphous substitution.

When the clay minerals of the laminated-layer structure are treated with an acid, metal cations existing among the layers of the laminated-layer structure elute out, causing the laminated-layer structure of the basic three-layer structure to be partly cut apart. Even in the basic three-layer structure, portions of the intermediate $AlO_6$ octahedral layer elute out from the edges of the basic three-layer structure. Furthermore, the BET specific surface area increases accompanying the treatment with an acid, as a matter of course.

When the tendencies of elution of iron and alumina with acid are examined during the treatment with the acid, iron tends to be more eluted out than alumina offering a great advantage for producing the activated clay. Thus, when it is attempted to produce the activated clay having a BET specific surface area of not smaller than 250 $m^2/g$ by simply treating the dioctahedral smectite clay minerals with the acid, the iron components contained in the clay minerals are eluted out with the acid, and there is obtained the activated clay containing iron component in an amount considerably smaller than 2.5% by weight calculated as $Fe_2O_3$. On the other hand, when it is attempted to leave the iron component in an amount of not smaller than 2.5% by weight as the $Fe_2O_3$ oxide in the activated clay, the BET specific surface area becomes considerably smaller than 250 $m^2/g$, and the activated clay exhibits a low activity and a short life when it is used as a catalyst for treating aromatic hydrocarbons.

According to one aspect of the present invention, there is obtained activated clay satisfying both of the above-mentioned two requirements by treating dioctahedral smectite clay minerals having an iron content of from 5 to 25% by weight calculated as $Fe_2O_3$ with an acid so as to possess a BET specific surface area of not smaller than 250 $m^2/g$ and a content of iron of not smaller than 2.5% by weight calculated as $Fe_2O_3$ (hereinafter often referred to as the starting clay selection method).

According to another aspect of the present invention, there is obtained activated clay satisfying both of the above-mentioned two requirements by treating dioctahedral smectite clay minerals with an acid until they possess BET specific surface areas of not smaller than 250 $m^2/g$ and, then, hydrolyzing an aqueous solution of an iron salt in the presence of the acid-treated product thereof, so that an iron component is settled in an amount of not smaller than 0.5% by weight calculated as $Fe_2O_3$ and that the amount of the $Fe_2O_3$ oxide is not smaller than 2.5% by weight as a whole.

[Activated clay]

There is no particular limitation on the activated clay of the present invention so far as the above-mentioned requirements are satisfied. Described below is a composition of a representative activated clay, to which only, however, the present invention is in no way limited, as a matter of course.

| Composition | |
|---|---|
| $SiO_2$ | 65 to 80% by weight |
| $Al_2O_3$ | 8 to 13% by weight |
| $Fe_2O_3$ | 2.5 to 10% by weight |
| MgO | 1 to 3% by weight |

-continued

| Composition | |
|---|---|
| CaO | 0.5 to 2% by weight |
| Ignition loss | 5 to 9% by weight |

In the activated clay for treating aromatic hydrocarbons of the present invention, it is desired that the $SiO_2/Al_2O_3$ molar ratio is from 8.0 to 17.0 and, particularly, from 9.0 to 13.0 and the $SiO_2/Fe_2O_3$ molar ratio is from 16.0 to 85.0 and, particularly, from 20.0 to 65.0.

In the activated clay having the $SiO_2/Fe_2O_3$ molar ratio smaller than the above-mentioned range, the activity for polymerizing olefins and its sustenance tend to decrease. On the other hand, the activated clay having the $SiO_2/Fe_2O_3$ molar ratio larger than the above-mentioned range tend to develop side reactions such as disproportionation reaction and the like reaction.

The iron component may exist in the activated clay in a form being incorporated in the basic skeleton of the clay minerals, in a form separate from the basic skeleton, or in a form of combination thereof.

In general, it is desired that at least part of the iron component exists in the form of a hydroxyl group-containing iron (III) compound.

The presence of the hydroxyl group-containing iron (III) compound, when its amount is relatively large, can be confirmed by an infrared-ray absorption peak at a wave number of from 890 to 860 $cm^{-1}$.

Figure 4:
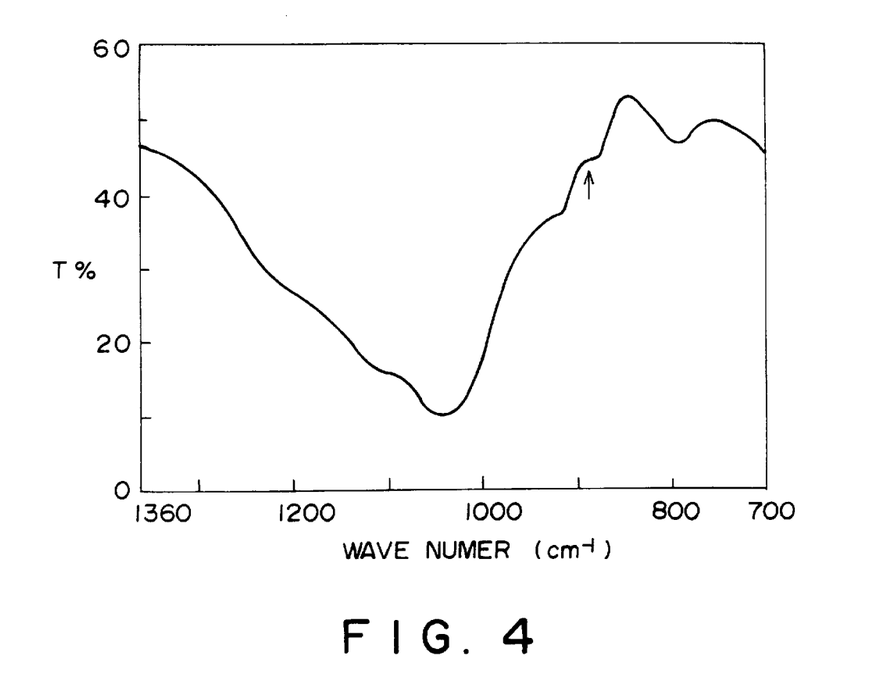
FIG. 4 is a diagram illustrating an infrared-ray absorption spectrum of the activated clay prepared in Example 2.

FIG. 4 shows an infrared ray absorption spectrum of the activated clay containing an iron component in an amount of 8.3% by weight (see Example 2 appearing later).

The presence of the hydroxyl group-containing iron (III) compound, when its amount is relatively large, can be confirmed by an endothermic peak at 400 to 500° C. in the differential thermal analysis.

Figure 5:
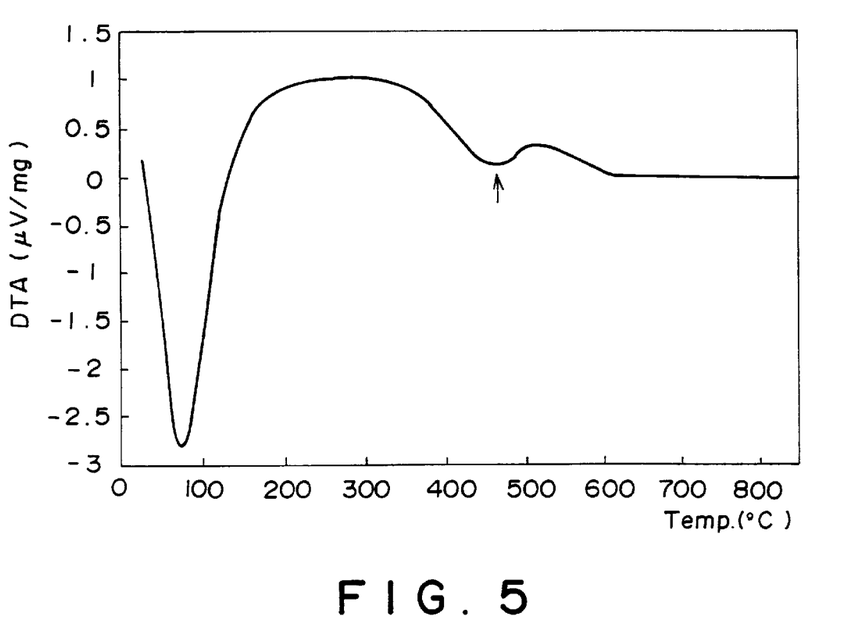
FIG. 5 is a diagram illustrating a differential thermal analysis curve of the activated clay prepared in Example 2.

FIG. 5 shows a differential thermal analysis curve of the activated clay containing the iron component in an amount of 8.3% by weight (see Example 2 appearing later).

In either the above-mentioned clay selection method or the post-addition method, at least part of, or preferably, most of, the iron component exists in the form of the hydroxyl group-containing iron (III) compound. This is attributed to that the iron component has a strong mutual action to the silica-alumina skeleton even when the iron component exists outside the silica-alumina skeleton that stems from the clay.

As a model of the mutual action, a silica tetrahedral layer of a basic three-layer structure of clay exists on the surface of the activated clay, the tetrahedral layer being negatively charged as an attribute of silica. On the other hand, the hydroxyl group-containing iron (III) compound exists in the form of iron ions or iron complex ions in which a hydroxyl group is coordinated, the two, presumably, being electrically bonded together.

In the case of the post-addition method, it is desired that at least part of, or most of, the iron component in the activated clay exists in the form of an iron salt represented by the following formula wherein M is an alkali metal.

The presence of the iron component can be confirmed by the X-ray diffraction.

Figure 6:
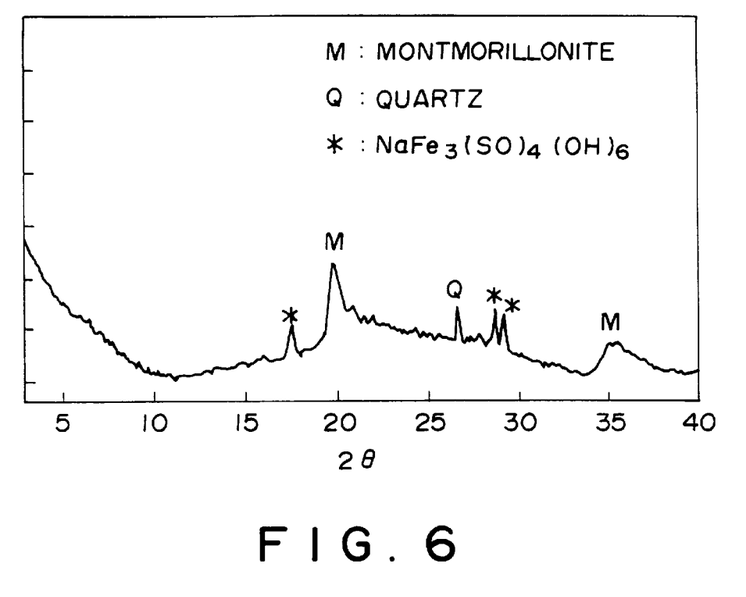
FIG. 6 is a diagram illustrating an X-ray diffraction image of the activated clay prepared in Example 4.

FIG. 6 shows an X-ray diffraction image of the activated clay by the post-addition method (see Example 4 appearing later).

The activated clay for treating aromatic hydrocarbons used in the present invention has an X-ray diffraction peak over a spacing of from 17 to 19 angstroms in a state of being treated with an ethylene glycol.

Figure 7:
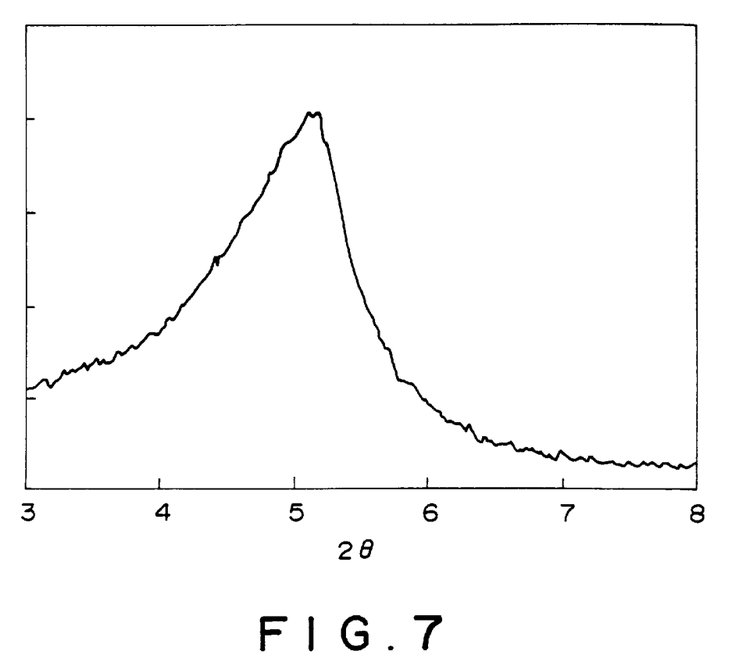
FIG. 7 is a diagram illustrating an X-ray diffraction image of the activated clay prepared in Example 2 and treated with an ethylene glycol.

FIG. 7 is an X-ray diffraction image of the activated clay for treating aromatic hydrocarbons, treated with an ethylene glycol, for use in the present invention (see Example 2 appearing later).

The treatment with the ethylene glycol is effected so that spacings of bottom surface reflection of an index of a plane (001) lie within the predetermined range, from which it is obvious that the activated clay of the present invention is not basically losing the layer structure of the dioctahedral smectite clay minerals.

It was mentioned already that the activated clay used in the present invention has a BET specific surface area of not smaller than 250 m$^2$/g and, particularly, from 300 to 400 m$^2$/g. This large specific surface area is, at the same time, related to macropores in the activated clay.

The activated clay of the present invention has a porous volume of porous radii of 100 to 70000 angstroms of as large as from 0.10 to 0.30 ml/g, which is believed to be very helpful for increasing the diffusion rate which determines the rate of adsorbing olefins.

The activated clay used in the present invention has a property same as that of Lewis acid. The property of Lewis acid can be confirmed by the appearance of an absorption peak at a wave number of 1460 to 1440 cm$^{-1}$ by permitting the activated clay to adsorb pyridine and measuring the infrared ray absorption spectrum.

Figure 8:
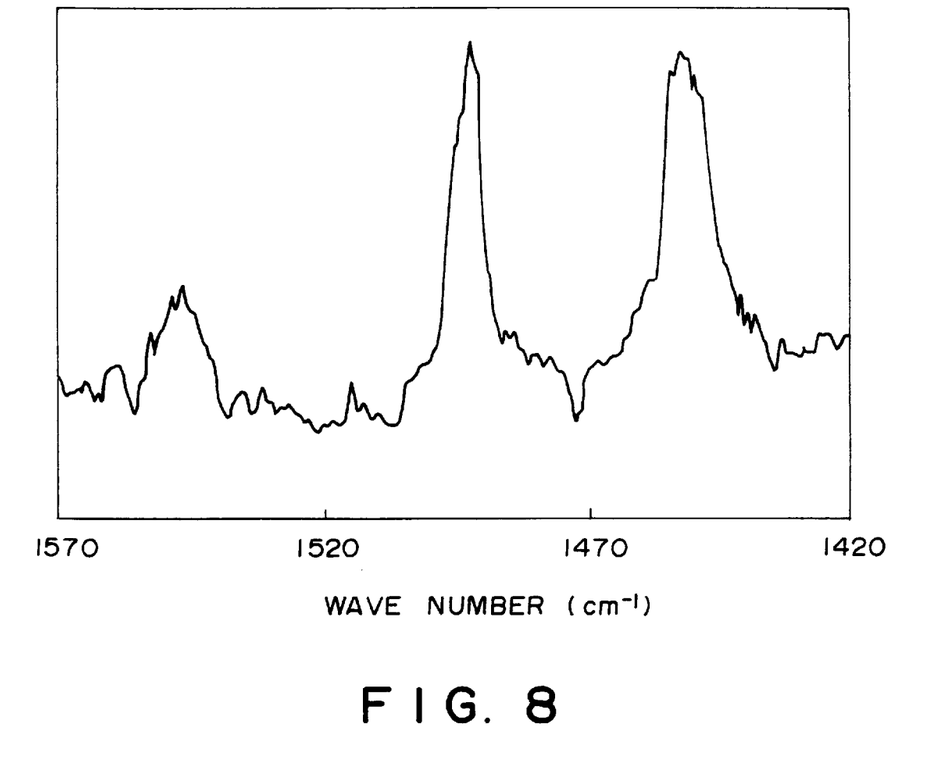
FIG. 8 is a diagram of an infrared ray absorption spectrum of the activated clay prepared in Example 2 after having adsorbed pyridine.

FIG. 8 shows an infrared ray absorption spectrum of the iron-containing activated clay obtained by the starting clay selection method that had adsorbed pyridine (see Example 2 appearing later).

The agent for treating aromatic hydrocarbons of the present invention is used in the form of a so-called powder. When used as the powder, the particles have a median diameter of generally from 20 to 40 μm and, particularly, from 25 to 35 μm, and is used for the batchwise treatment.

When used for the fixed bed, the activated clay is used in the form of so-called particles. In the case of the particles, it is desired that the particle diameter is generally from 0.25 to 1.0 mm, and the shape of the particles is spherical, granular, cubic, tablet, cylindrical or irregular-shaped.

[Starting clay minerals]

The starting dioctahedral smectite clay used in the present invention must have a BET specific surface area lying in the above-mentioned range upon the treatment with an acid though it may differ depending upon the starting clay selection method or the post-addition method. The degree of activation of the starting clay by the treatment with an acid and the chemical composition differ depending upon the components of the clay, place where it is produced and site where it is buried (working face) even in the same place of production. Therefore, those satisfying the above-mentioned requirements should be selected.

It is considered that the dioctahedral smectite is formed as the volcanic ash or lava is modified being affected by the seawater.

Examples of the dioctahedral smectite clay minerals include acidic clay (named like this since it exhibits acidity when suspended in a saline solution) produced in large amounts in Japan, as well as sodium-type bentonite, calcium-type bentonite, magnesium-type bentonite, sub-bentonite, nontronite, beidellite, fuller's earth, and the like.

Described below is a chemical composition of representative starting clay minerals.

| | |
|---|---|
| $SiO_2$ | 45 to 65% by weight |
| $Al_2O_3$ | 13 to 25% by weight |
| $Fe_2O_3$ | 5 to 25% by weight |
| MgO | 2 to 6% by weight |
| CaO | 0.1 to 3.0% by weight |
| $K_2O$ | 0.1 to 1.0% by weight |
| $Na_2O$ | 0.1 to 3.0% by weight |
| Ignition loss | 6 to 12% by weight |

The smectite clays used for the starting clay selection method contains 5 to 25% by weight of the $Fe_2O_3$ oxide and, particularly, 10 to 20% by weight of the iron component. The iron component may exist in the starting clays in any form; i.e., the iron component may exist in the basic structure of the clay, among the layers of the laminar structure or outside the structure of the clay. This is because, the iron component present in the structure of the clay tends to remain in the activated clay even after the treatment with an acid. Here, the iron component present in any other form is also solubilized by the treatment with an acid, and is hydrolyzed to remain in the activated clay.

As required, the dioctahedral smectite clay minerals are subjected to the refining operation such as stone-sand separation, ore dressing by buoyancy, magnetic ore dressing, hydraulic elutriation or air elutriation, and are then subjected to the treatment with an acid.

[Treatment with an acid]

The treatment with an acid is so effected that the acid-treated product will have a BET specific surface area that lies within a range specified by the present invention. The treatment with an acid can be carried out by either the granular activation method or the sludge activation method.

The following description deals with the granular activation to which only, however, the present invention is in no way limited.

In the granular activation, the starting clay minerals must be prepared in the form of particles suited for being treated with an acid prior to bringing them into contact with the acid. The ore that is dug usually contains the water in an amount of about 35 to about 40% by weight, and this water serves as a medium for granulating the clay.

By using a rag crasher as a coarse milling machine, the core is coarsely milled and, then, the clay is kneaded. The kneading is effected by using a grooved roll, a plain roll or a combination thereof. Then, the kneaded clay is granulated into a predetermined size. It is desired that the particles have a diameter of, usually, from 3 to 15 mm and, particularly, from to 7 mm.

A suitable granulating machine will be a pair of perforated rolls. The clay is supplied to a nipping position of the rolls; i.e., the clay is passed from the outside to the inside of the rolls so as to be granulated into a predetermined size.

The conditions for treatment with the acid are such that the obtained acid-treated product will have the above-mentioned BET specific surface area and that a predetermined iron component remains in the acid-treated product obtained by the starting clay selection method.

The treatment with an acid is carried out by filling a treatment vessel with the granular clay and circulating an aqueous solution containing an acid. The aqueous solution contains mineral acids, such as sulfuric acid, hydrochloric acid, or the like acid and, particularly, contains sulfuric acid, at a concentration of about 20 to about 35% by weight. The treating temperature is selected from a range of from 80 to 95° C. and the treating time is selected from a range of from 3 to 20 hours to satisfy the above-mentioned requirements.

The mother liquor after the treatment with the acid contains basic components such as alumina, magnesium, iron, etc. Therefore, the mother liquor can be used as a starting material for an inorganic liquid coagulating agent.

After the mother liquor is recovered, the acid-treated product contained in the treatment vessel is washed with water by circulating the washing water. After washing with water, the acid-treated product is dried, milled and is classified to obtain a product of activated clay. The granular activated clay can be produced by either the method of dry-pulverizing or molding the acid-treated product after washing with water or the method of molding the activated clay powder.

[Post-addition of iron component]

The iron component can be added to the activated clay containing the iron component in a small amount. That is, an aqueous solution of an iron salt is hydrolyzed in the presence of activated clay treated with an acid until it possesses a BET specific surface area of not smaller than 250 m$^2$/g, and the iron component is settled in an amount of not smaller than 0.5% by weight as the Fe$_2$O$_3$ oxide, so that the amount of the Fe$_2$O$_3$ is not smaller than 2.5% by weight as a whole. This addition can be advantageously carried out for the acid-treated product (activated clay) which has been washed with water but which has not been dried yet. The iron component, however, may be added to the dry product.

As the aqueous solution of an iron salt, there can be used a divalent iron salt or a trivalent iron salt. In the case of the divalent iron salt, the oxidation treatment must be carried out by blowing the air. As the iron salt, there can be used a water-soluble inorganic salt such as iron sulfate (II), heptahydrate of iron sulfate (III), iron chloride (II), iron chloride (III), iron nitrate (II), iron nitrate (III), diammonium iron bis sulfate (II), ammonium iron bis sulfate (III), iron potassium bis sulfate (II), ammonium iron hexacyanoate (II), ammonium iron hexacyanoate (III), potassium iron hexacyanoate (II), or potassium iron hexacyanoate (III), or a water-soluble organic salt such as iron acetate (II), iron acetate (III) or the like.

To the acid-treated product washed with water is added an aqueous solution of these iron salts in an amount corresponding to the amount of the iron component that is to be added, an alkali such as sodium hydroxide or potassium hydroxide is added thereto, and the iron salt is hydrolyzed, so that the hydroxy group-containing iron compound is settled on the activated clay.

It is desired that the concentration of the iron salt solution used for the hydrolysis is from 2 to 20% by weight, and that the hydrolysis is slowly conducted at a temperature of from 25 to 80° C. maintaining a pH of 1.0 to 2.0 over an extended period of time.

According to a preferred means of the present invention, a divalent iron salt and, particularly, ferrous sulfate is used as a water-soluble iron salt, an alkali is added thereto to maintain a pH over a range of from 1.0 to 2.0, and the air is blown to effect the oxidation treatment, so that the iron salt and, particularly, the iron salt represented by the following formula MFe$_3$(SO$_4$)$_2$(OH)$_6$ wherein M is an alkali metal, is settled or bonded to the activated clay. According to this method, the solution remains stable in a stage where the pH of the iron salt solution is adjusted, and the iron component is settled or bonded accompanying the oxidation with oxygen, offering such an advantage that the iron component is firmly bonded and the bonding states are homogeneous and uniform.

As required, the activated clay containing the iron component can be subjected to the heat treatment such as drying or firing. Through drying or firing, it is considered that the concentration of silanol groups decreases on the surfaces of the activated clay, and the clay swells little in the water. It is desired that the drying or firing is conducted usually at a temperature of from 80 to 500° C. and, particularly, from 100 to 300° C. for a period of from 0.5 to 10 hours and, particularly, from 0.7 to 5 hours.

EXAMPLES

The invention will now be described below. Measurements were taken according to the methods described below.

(1) Testing the life of clay samples.

A reaction tube made of a stainless steel was filled with 8 ml of clay dried at 150° C. for 3 hours, and was installed in a constant-temperature bath. The interior of the system was pressurized with a nitrogen gas to 15 kg/cm$^2$. By feeding a mixture xylene having a bromine index of 550 (mg/100 g)(a bromine index of a 70% fraction of 240) as a feed oil, the flow rate was so adjusted that the liquid-space rate was 3 h$^{-1}$. The temperature of a constant-temperature vessel was raised to 165° C., and a moment when 165° C. was reached as regarded to be a start point of testing. The oil flowing out from the outlet of the clay reaction tube was sampled every after a predetermined period of time to measure the bromine index and the amount of disproportionation reaction.

(2) Measurement of bromine index.

Measured by using a electric amount titration-type measuring equipment, model CA-06, manufactured by Mitsubishi Kasei Kogyo Co.

(3) Measurement of the amount of the disproportionation reaction.

Measured by using a gas chromatograph GC-14A manufactured by Shimazu Seisakusho Co. Measuring conditions consisted of using a detector FID, a carrier gas of helium, a temperature at a injection port of 170° C. and a column temperature of 110° C., and the amount of toluene and the amount of benzene were measured by the internal standard method.

(4) Specific surface area.

Measured according to a BET method by using Sorptomatic Series 1900 manufactured by Carlo Erba Co.

(5) Chemical composition.

The ignition loss (Ig-loss), silicon dioxide (SiO$_2$), aluminum oxide (Al$_2$O$_3$), iron oxide (Fe$_2$O$_3$), calcium oxide (CaO) and magnesium oxide (MgO) were analyzed in compliance with JIS M-8855. Na$_2$O and K$_2$O were measured by the atomic absorption method. The measurement was taken by using 1 g of a sample that has been dried at 110° C. for 3 hours.

(6) Measurement of infrared ray (IR).

Measured by a KBr method by using an infrared ray absorption spectrum analyzer, model FT/IR-610, manufactured by Nippon Bunko Co. The samples that had adsorbed pyridine were measured for their IR by using an infrared ray absorption spectrum analyzer, model A-302, manufactured by Nippon Bunko Co.

(7) Differential thermal analysis.

Measured by using a TAS-100/standard differential thermal balance TG-DTA manufactured by Rigaku Co. The thermal analysis was conducted under the conditions of using α-Al$_2$O$_3$ as a standard substance while raising the temperature at a rate of 10° C./min in an atmosphere of room temperature through up to 850° C.

(8) Filling density.

50 Grams of a sample was introduced into a 200-ml graduated cylinder which was then vibrated until the packed volume changed no longer, thereby to calculate a packing density.

(9) Particle size distribution.

Shook for 15 minutes by using a testing sieve having a size of opening of 0.85–0.60–0.25 mm stipulated under JIS and a shaking machine. The distribution of particle sizes was measured relying upon the weights of the sample on the sieve and under the sieve.

(10) X-ray diffraction.

(10-1) Ordinary X-ray diffraction

Measured by using a Geiger-Flex RAD-1B system manufactured by Rigaku Denki Co. and a Cu-Kα ray under the following conditions.

| | |
|---|---|
| Target | Cu |
| Filter | Ni |
| Tube voltage | 35 kV |
| Tube current | 15 mA |
| Scanning rate | 2 deg/min |
| Time constant | 1 sec |
| Slit | DS(SS) 2 deg RS 0.3 mm |

(10-2) X-ray diffraction of when the sample is treated with an ethylene glycol.

A sample dried at 110° C. for 2 hours was picked up in an amount of 1.0 g, and to which was added 5 ml of a 10% ethylene glycol aqueous solution by using a whole pipette. The sample was mixed well with a stirrer rod and was dried at 60° C. for 2 hours. The dried product was ground down in an agate mortar, and the resulting powder was subjected to the X-ray diffraction measurement under the following conditions.

| | |
|---|---|
| Target | Cu |
| Filter | Ni |
| Tube voltage | 40 kV |
| Tube current | 20 mA |
| Scanning rate | ½ deg/min |
| Time constant | 2 sec |
| Slit | DS(SS) ½ deg RS 0.3 mm |

(11) pH.

A pH of a 5% suspension was measured in compliance with JIS K-5101-26.

(12) Amount of solid acid.

Measured in compliance with a method of measuring n-butylamine [reference literature: "Catalyst", Vol. 11, No. 6, pp. 210–216, 1969".

Example 1

The dioctahedral smectite clay minerals shown in Table 1 were used as starting materials, and were coarsely milled and kneaded into particles of 5 mm in diameter. 1000 Grams of the particles were filled into a treating layer. 1500 Grams of an aqueous solution containing 30% by weight of sulfuric acid was circulated therein. The treating temperature was 90° C. and the treating time was 5 hours. After the treatment with the acid, the acid-treated product was washed with water by circulating the washing water, and was then dried at 110° C., milled, and was sieved to obtain particles having diameters of from 0.85 to 0.25 mm in order to obtain granular activated clay. The obtained activated clay was measured for its physical properties to be as shown in Table 1.

The activated clay was further tested for its life and disproportionation, and favorable results were obtained as shown in FIGS. 1, 2 and 3.

Example 2

The dioctahedral smectite clay minerals shown in Table 1 were used as starting materials, and were coarsely milled and kneaded into particles of 5 mm in diameter. 1000 Grams of the particles were filled into a treating layer. 1500 Grams of an aqueous solution containing 32% by weight of sulfuric acid was circulated therein. The treating temperature was 90° C. and the treating time was 6 hours. After the treatment with the acid, the acid-treated product was washed with water by circulating the washing water, and was then dried at 110° C., milled, and was sieved to obtain particles having diameters of from 0.85 to 0.25 mm in order to obtain granular activated clay. The obtained activated clay was measured for its physical properties to be as shown in Table 1. FIG. 4 shows the results of measuring IR, FIG. 5 shows the results of differential thermal analysis, FIG. 7 shows an X-ray diffraction image of the activated clay treated with an ethylene glycol, and FIG. 8 shows the results of measuring IR of the activated clay that had adsorbed pyridine.

The activated clay was further tested for its life and disproportionation, and favorable results were obtained as shown in FIGS. 1, 2 and 3.

Example 3

The dioctahedral smectite clay minerals shown in Table 1 were used as starting materials, and were coarsely milled and kneaded into particles of 5 mm in diameter. 1000 Grams of the particles were filled into a treating layer. 1500 Grams of an aqueous solution containing 28% by weight of sulfuric acid was circulated therein. The treating temperature was 90° C. and the treating time was 4 hours. After the treatment with the acid, the acid-treated product was washed with water by circulating the washing water, and was then dried at 110° C., milled, and was sieved to obtain particles having diameters of from 0.85 to 0.25 mm in order to obtain granular activated clay. The obtained activated clay was measured for its physical properties to be as shown in Table 1.

The activated clay was further tested for its life and disproportionation, and favorable results were obtained as shown in FIGS. 1, 2 and 3.

Example 4

Figure 9:
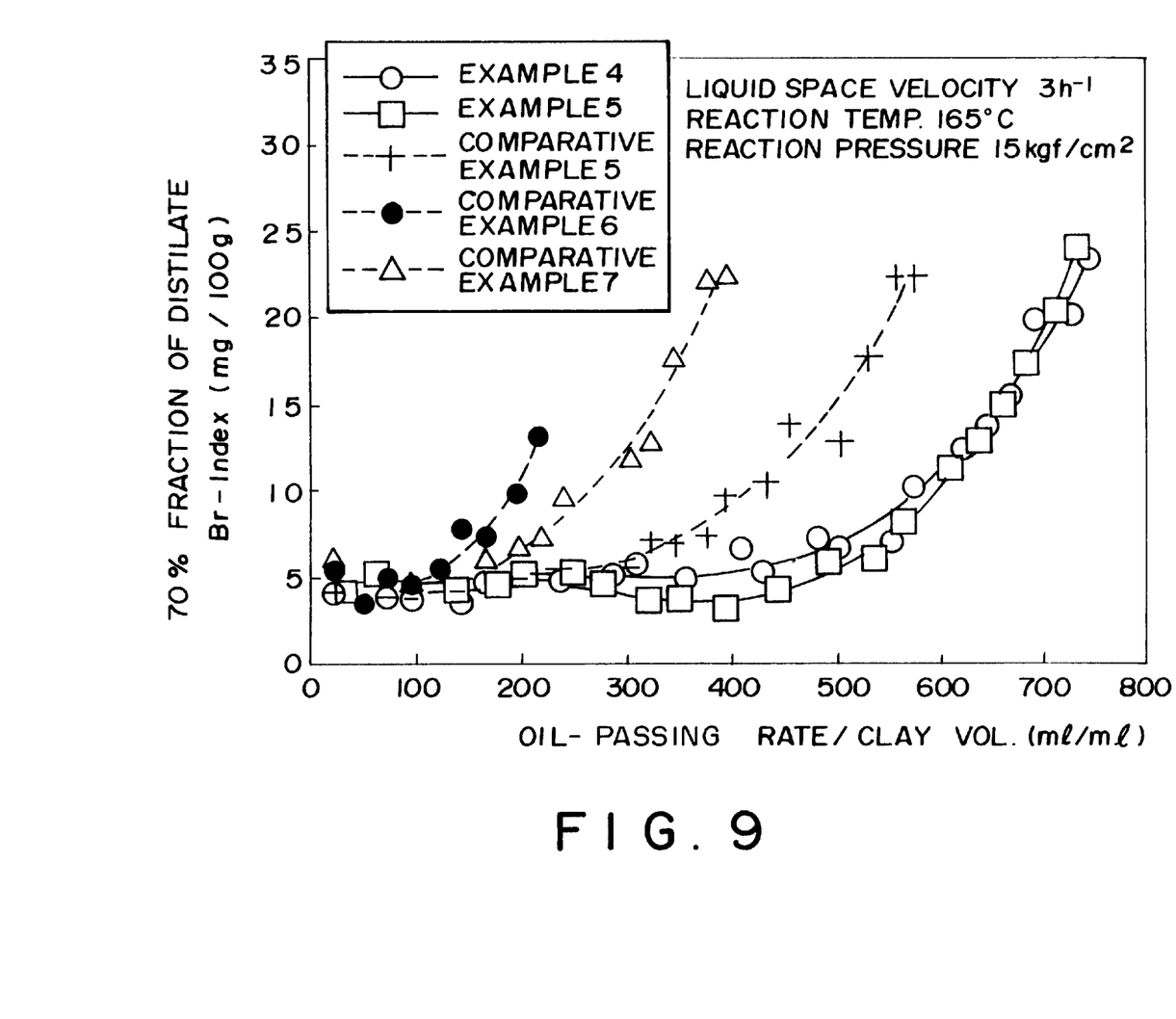
FIG. 9 is a diagram illustrating a relationship between the oil-passing rates and the bromine indexes in the 70% fraction of distillate recovered by distillation in Examples 4 and 5 and in Comparative Examples 5 to 7.
Figure 10:
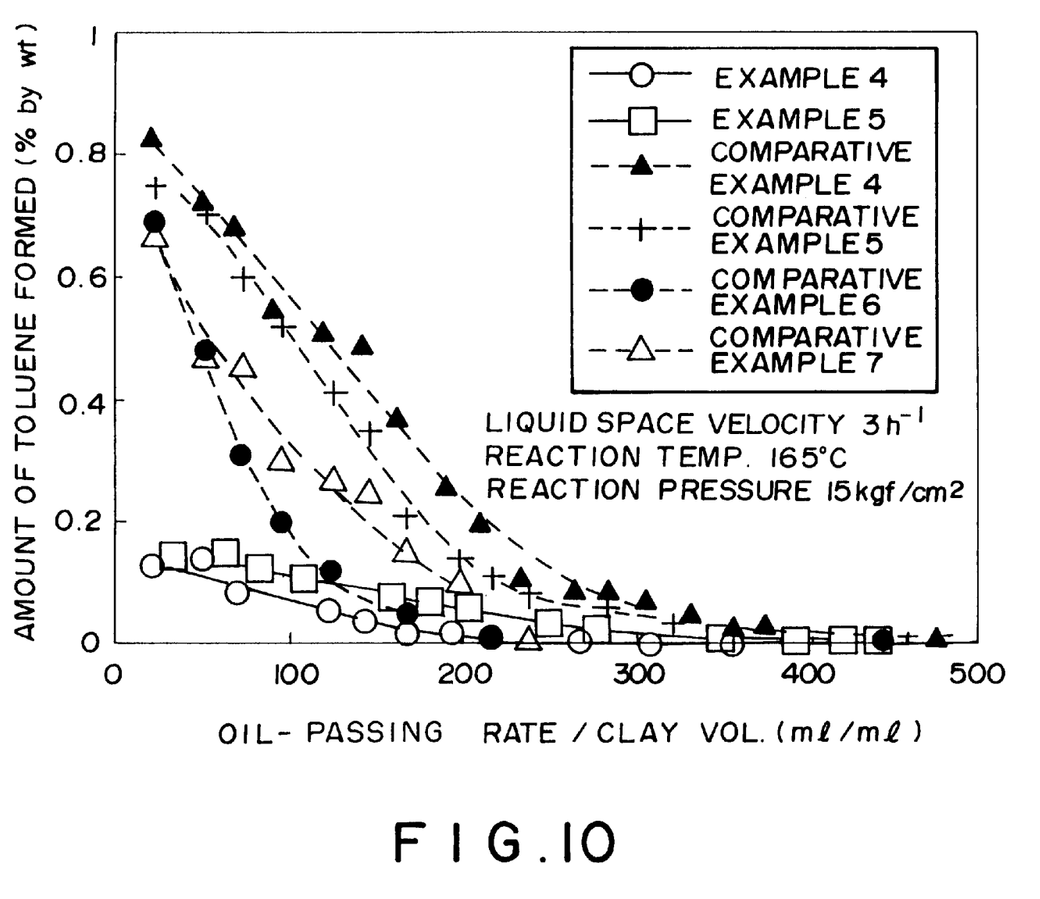
FIG. 10 is a diagram illustrating a relationship between the oil-passing rates and the amounts of toluene in the 70% fraction of distillate recovered by distillation in Examples 4 and 5 and in Comparative Examples 4 to 7.
Figure 11:
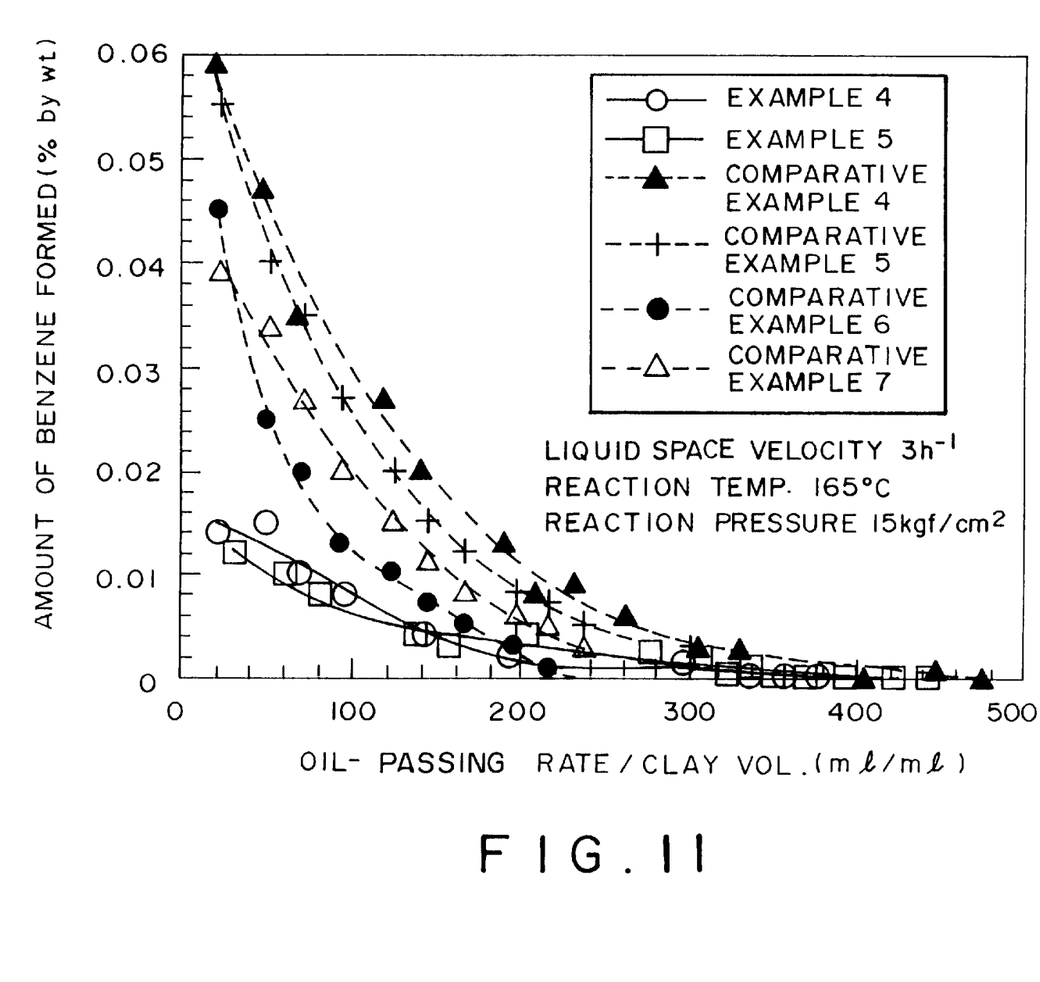
FIG. 11 is a diagram illustrating a relationship between the oil-passing rates and the amounts of benzene in the 70% fraction of distillate recovered by distillation in Examples 4 and 5 and in Comparative Examples 4 to 7.

The dioctahedral smectite clay minerals shown in Table 1 were used as starting materials, and were coarsely milled and kneaded into particles of 5 mm in diameter. 1000 Grams of the particles were filled into a treating layer. 1500 Grams of an aqueous solution containing 32% by weight of sulfuric acid was circulated therein. The treating temperature was 90° C. and the treating time was 6 hours. After the treatment with the acid, the acid-treated product was washed with water by circulating the washing water, and was then dispersed in an aqueous solution containing ferrous sulfate at a concentration of 15%, and to which was further added sodium hydroxide while blowing the air to effect the hydrolysis at a temperature of 60° C. and a pH of 1.5. Thereafter, the washing water was circulated to wash the product with water. The product was then dried at 110° C., milled, and was sieved to obtain particles having diameters of from 0.85 to 0.25 mm in order to obtain granular activated clay. After iron was added thereto, the activated clay was measured for its physical properties to be as shown in Table 2. FIG. 6 shows an X-ray diffraction image of the activated clay. The activated clay was further tested for its life and disproportionation, and favorable results were obtained as shown in FIGS. 9, 10 and 11.

The granular activated clay obtained in Comparative Example 4 that will be described later was dispersed in the aqueous solution containing ferrous sulfate at a concentration of 15%, and sodium hydroxide was added thereto while blowing the air to effect the hydrolysis at a temperature of 60° C. and pH of 1.5 in order to obtain the activated clay. There were obtained the same results as those of Example 4.

Example 5

The dioctahedral smectite clay minerals of Example 4 shown in Table 1 were used as starting materials, and iron oxide was added thereto in an amount of 15 parts per 100 parts of the starting materials. The mixture was then coarsely milled and kneaded into particles of 5 mm in diameter. 1000 Grams of the particles were filled into a treating layer. 1500 Grams of an aqueous solution containing 32% by weight of sulfuric acid was circulated therein. The treating temperature was 90° C. and the treating time was 8 hours. After the treatment with the acid, the acid-treated product was washed with water by circulating the washing water, and was then dried at 110C, milled, and was sieved to obtain particles having diameters of from 0.85 to 0.25 mm in order to obtain granular activated clay. After iron was added, the activated clay was measured for its physical properties to be as shown in Table 2.

The activated clay was further tested for its life and disproportionation, and favorable results were obtained as shown in FIGS. 9, 10 and 11.

Comparative Examples 1 to 3

Commercially available activated clay having compositions shown in Table 2 were milled, kneaded and were sieved to obtain particles of diameters of from 0.85 to 0.25 mm in order to obtain granular clay. The obtained activated clay were measured for their physical properties to be as shown in Table 2. The activated clay were further tested for their lives and disproportionation. The results were as shown in FIGS. 1, 2 and 3.

Figure 12:
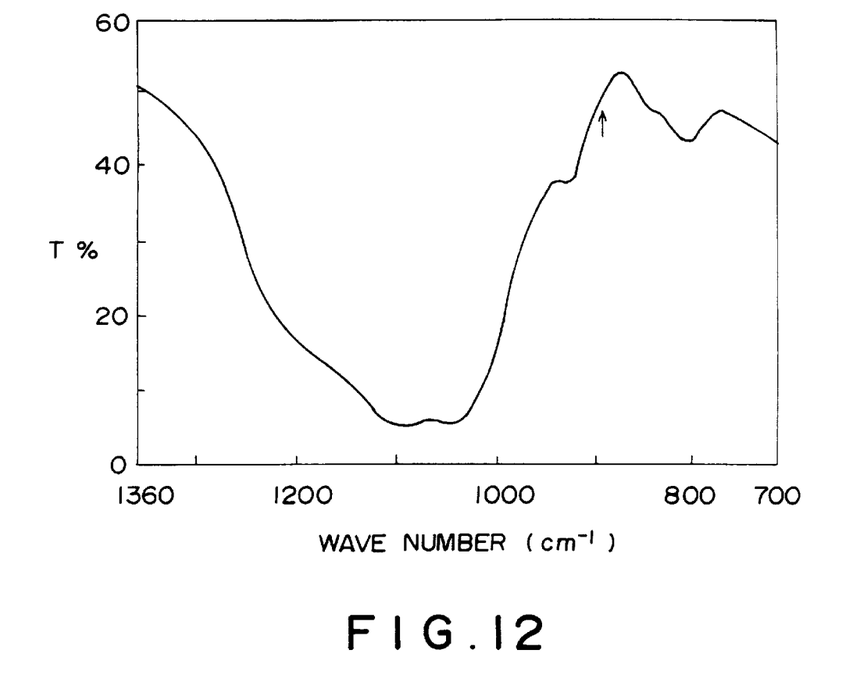
FIG. 12 is a diagram illustrating an infrared-ray absorption spectrum of the activated clay prepared in Comparative Example 3.
Figure 13:
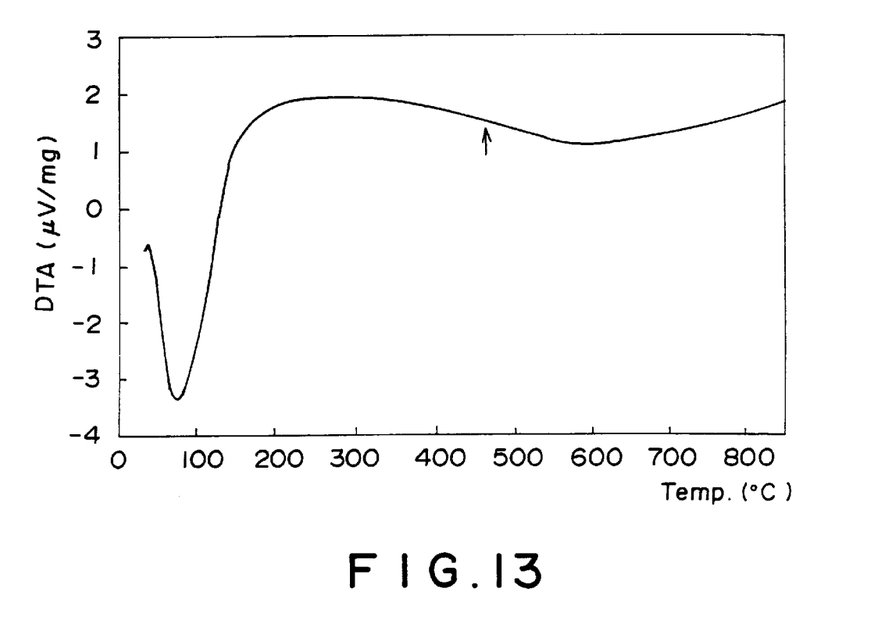
FIG. 13 is a diagram illustrating a differential thermal analysis curve of the activated clay prepared in Comparative Example 3.

The activated clay were subjected to the IR measurement and differential thermal analysis. FIG. 12 shows the results of IR measurement and FIG. 13 shows the results of differential thermal analysis. In the IR measurement, no infrared ray absorption peak was observed over the wave numbers of from 890 to 860 cm$^{-1}$. In the differential thermal analysis, no endothermic peak was observed at 400 to 500° C.

Comparative Example 4

The starting clay same as the one used in Example 4 was treated with an acid under the conditions same as those of Example 4, and was, then, washed, dried, milled and was sieved to obtain particles having diameters of from 0.85 to 0.25 mm in order to obtain granular activated clay. The activated clay was measured for its physical properties to be as shown in Table 2. The activated clay was further tested for its life and disproportionation. The results were the same as those of Example 4. The amount of toluene that was formed and the amount of benzene that was formed were as shown in FIGS. 10 and 11.

Comparative Example 5

Iron oxide was mixed in an amount of 5% by weight into the granular activated clay obtained in Comparative Example 4, and the mixture was milled. Thereafter, the amount of water was adjusted to be about 35%, and the mixture was molded into particles of a diameter of 0.8 mm, and was dried at 110° C., milled and was sieved to obtain particles having diameters of from 0.85 to 0.25 mm in order to obtain granular activated clay. The obtained activated clay was measured for its physical properties to be as shown in Table 2. The activated clay was further tested for its life and disproportionation to be as shown in FIGS. 9, 10 and 11.

Comparative Example 6

The dioctahedral smectite clay minerals of Example 4 shown in Table 1 were used as starting materials, and were coarsely milled and kneaded into particles of 5 mm in diameter. 1000 Grams of the particles were filled into a treating layer. 1500 Grams of an aqueous solution containing 20% by weight of sulfuric acid was circulated therein. The treating temperature was 80° C. and the treating time was 4 hours. After the treatment with the acid, the acid-treated product was washed with water by circulating the washing water, and was then dried at 110° C., milled, and was sieved to obtain particles having diameters of from 0.8 to 0.25 mm in order to obtain granular activated clay. The obtained activated clay was measured for its physical properties to be as shown in Table 2.

The activated clay was further tested for its life and disproportionation. The results were as shown in FIGS. 9, 10 and 11.

Comparative Example 7

The dioctahedral smectite clay minerals of Example 4 shown in Table 1 were used as starting materials, and were coarsely milled and kneaded into particles of 5 mm in diameter. 1000 Grams of the particles were filled into a treating layer. 1500 Grams of an aqueous solution containing 36% by weight of sulfuric acid was circulated therein. The treating temperature was 90° C. and the treating time was 8 hours. After the treatment with the acid, the acid-treated product was washed with water by circulating the washing water, and was then dried at 110° C., milled, and was sieved to obtain particles having diameters of from 0.85 to 0.25 mm in order to obtain granular activated clay. The obtained activated clay was measured for its physical properties to be as shown in Table 2.

The activated clay was further tested for its life and disproportionation. The results were as shown in FIGS. 9, 10 and 11.

TABLE 1

| Properties | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Starting clay | | | | | | | |
| Chemical composition | | | | | | | |
| Ig-loss (%) | 8.0 | 7.3 | 6.9 | | | | 10.0 |
| SiO$_2$ (%) | 52.0 | 51.0 | 59.4 | | | | 58.3 |

TABLE 1-continued

| Properties | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| $Al_2O_3$ (%) | 16.8 | 14.3 | 16.1 | | | | 19.0 |
| $Fe_2O_3$ (%) | 15.1 | 19.8 | 10.6 | | | | 4.4 |
| CaO (%) | 1.9 | 2.0 | 1.4 | | | | 2.0 |
| MgO (%) | 3.6 | 2.5 | 3.5 | | | | 3.4 |
| $Na_2O$ (%) | 1.8 | 1.9 | 1.5 | | | | 1.5 |
| $K_2O$ (%) | 0.1 | 0.1 | 0.1 | | | | 0.3 |
| Total (%) | 99.3 | 98.9 | 99.5 | | | | 98.9 |
| Activated clay Chemical composition | | | | | | | |
| Ig-loss (%) | 7.6 | 7.7 | 7.3 | 7.3 | 6.1 | 9.3 | 8.8 |
| $SiO_2$ (%) | 70.8 | 68.7 | 72.5 | 62.3 | 80 | 73.1 | 73.9 |
| $Al_2O_3$ (%) | 11.0 | 11.0 | 10.4 | 16.4 | 8.7 | 10.9 | 11.4 |
| $Fe_2O_3$ (%) | 6.3 | 8.3 | 5.7 | 5.4 | 1.9 | 1.5 | 1.5 |
| CaO (%) | 1.0 | 0.6 | 0.9 | 3.0 | 0.4 | 1.1 | 0.8 |
| MgO (%) | 1.8 | 1.0 | 1.8 | 2.6 | 2.2 | 3.3 | 2.9 |
| $Na_2O$ (%) | 0.1 | 0.1 | 0.1 | 0.3 | 0.2 | 0.2 | 0.2 |
| $K_2O$ (%) | 0.1 | 0.1 | 0.1 | 1.5 | 0.5 | 0.2 | 0.2 |
| Total (%) | 98.7 | 97.5 | 98.8 | 98.8 | 100.0 | 99.6 | 99.7 |
| $SiO_2/Al_2O_3$ | 10.9 | 10.6 | 11.8 | 6.4 | 15.6 | 11.4 | 11.0 |
| $SiO_2/Fe_2O_3$ | 30.0 | 22.1 | 33.8 | 30.7 | 111.9 | 129.5 | 130.9 |
| IR absorption peak | observed | observed | observed | | | not onserved | |
| TG endothermic peak | observed | observed | observed | | | not observed | |
| 5% susp pH | 2.9 | 3.0 | 3.1 | 8.4 | 3.2 | 2.3 | 3.1 |
| Specific surface area ($m^2$/a) | 311 | 313 | 330 | 130 | 300 | 349 | 379 |
| Filling density (g/ml) | 0.61 | 0.65 | 0.60 | 0.87 | 0.65 | 0.72 | 0.66 |
| Particle size distribution (/mm) | | | | | | | |
| ~0.85 (%) | 5.2 | 5.2 | 5.2 | 0.0 | 1.4 | 14.2 | 4.0 |
| 0.85~0.60 | 43.2 | 43 | 41.4 | 12.5 | 36.0 | 52.6 | 49.4 |
| 0.60~0.25 | 51.4 | 51.5 | 53.2 | 79.0 | 61.6 | 33.0 | 46.4 |
| 0.25~ | 0.2 | 0.3 | 0.2 | 8.5 | 1.0 | 0.2 | 0.2 |
| Amount of solid acid (mmol/g) | | | | | | | |
| $Ho \leq -5.6$ | 0.72 | 0.68 | 0.71 | 0.03 | 0.37 | 0.76 | 0.75 |
| $-5.6 < Ho \leq -3.0$ | 0.02 | 0.04 | 0.03 | 0.09 | 0.02 | 0.09 | 0.10 |
| $-3.0 < Ho \leq +1.5$ | 0.01 | 0.01 | 0.01 | 0.08 | 0.03 | 0.07 | 0.05 |
| $+1.5 < Ho \leq +3.3$ | 0.01 | 0.02 | 0.01 | 0.08 | 0.01 | 0.06 | 0.05 |
| $+3.3 < Ho \leq +4.8$ | 0.14 | 0.16 | 0.16 | 0.19 | 0.40 | 0.43 | 0.39 |

TABLE 2

| Properties | Example 4 | Example 5 | Comp. Ex. 5 | Comp. Ex. 6 | Comp. Ex. 7 |
|---|---|---|---|---|---|
| Starting clay Chemical composition | | | | | |
| Ig-loss (%) | 10.0 | ← | ← | ← | ← |
| $SiO_2$ (%) | 58.3 | ← | ← | ← | ← |
| $Al_2O_3$ (%) | 19.0 | ← | ← | ← | ← |
| $Fe_2O_3$ (%) | 4.4 | ← | ← | ← | ← |
| CaO (%) | 2.0 | ← | ← | ← | ← |
| MgO (%) | 3.4 | ← | ← | ← | ← |
| $Na_2O$ (%) | 1.5 | ← | ← | ← | ← |
| $K_2O$ (%) | 0.3 | ← | ← | ← | ← |
| Total (%) | 98.9 | ← | ← | ← | ← |
| Activated clay Chemical composition | | | *1 | | |
| Ig-loss (%) | 8.6 | 8.9 | 8.6(8.8) | 8.9 | 7.8 |
| $SiO_2$ (%) | 73.1 | 72.4 | 70.5(73.9) | 67.5 | 79.0 |
| $Al_2O_3$ (%) | 11.3 | 10.8 | 10.9(11.4) | 16.4 | 8.5 |
| $Fe_2O_3$ (%) | 3.4 | 4.5 | 6.2(1.5) | 2.9 | 1.6 |
| CaO (%) | 0.7 | 0.5 | 0.7(0.8) | 0.9 | 0.6 |
| MgO (%) | 2.4 | 2.3 | 2.6(2.9) | 3.0 | 2.1 |
| $Na_2O$ (%) | 0.2 | 0.2 | 0.2(0.2) | 0.2 | 0.1 |
| $K_2O$ (%) | 0.2 | 0.2 | 0.2(0.2) | 0.2 | 0.2 |
| Total (%) | 99.9 | 99.8 | 99.9(99.7) | 100.0 | 99.9 |
| $SiO_2/Al_2O_3$ | 11.0 | 11.4 | 11.0 | 7.0 | 15.8 |

TABLE 2-continued

| Properties | Example 4 | Example 5 | Comp. Ex. 5 | Comp. Ex. 6 | Comp. Ex. 7 |
|---|---|---|---|---|---|
| $SiO_2/Fe_2O_3$ | 57.1 | 42.8 | 30.2 | 61.8 | 24.7 |
| Method of carrying iron | post-addition | post-addition | mixed | post-addition | post-addition |
| Peak of iron salt of XRD | observed | observed | not observed | not observed | not observed |
| 5% susp pH | 3.0 | 3.2 | 3.8 | 3.1 | 3.0 |
| Specific surface area ($m^2/g$) | 360 | 363 | 265 | 240 | 430 |
| Filling density (g/ml) | 0.66 | 0.65 | 0.73 | 0.72 | 0.59 |
| Particle size distribution (/mm) | | | | | |
| ~0.85 (%) | 4.0 | 5.1 | 6.0 | 5.7 | 5.3 |
| 0.85~0.60 | 49.3 | 42.5 | 59.3 | 56.5 | 58.4 |
| 0.60~0.25 | 46.5 | 52.1 | 34.4 | 37.5 | 36.1 |
| 0.25~ | 0.2 | 0.3 | 0.3 | 0.3 | 0.2 |
| Amount of solid acid (mmol/g) | | | | | |
| $Ho \leq -5.6$ | 0.75 | 0.73 | 0.54 | 0.81 | 0.50 |
| $-5.6 < Ho \leq -3.0$ | 0.04 | 0.02 | 0.02 | 0.03 | 0.01 |
| $-3.0 < Ho \leq +1.5$ | 0.02 | 0.02 | 0.03 | 0.03 | 0.05 |
| $+1.5 < Ho \leq +3.3$ | 0.03 | 0.03 | 0.05 | 0.04 | 0.08 |
| $+3.3 < Ho \leq +4.8$ | 0.32 | 0.36 | 0.24 | 0.32 | 0.39 |

Values in parentheses are those of the activated clay of before iron was added.

Among the activated clay obtained by treating dioctahedral smectite clay minerals with an acid, according to the present invention, there are selected those having BET specific surface areas of not smaller than 250 $m^2/g$ and containing iron component in amounts of not smaller than 2.5% by weight calculated as $Fe_2O_3$, and these activated clay are used for the treatment of aromatic hydrocarbons, featuring very lengthened life as a catalyst and suppressing the side reactions such as disproportionation and isomerization of the alkyl aromatic hydrocarbons to a conspicuous degree.

What is claimed is:

1. An activated clay suitable for treating aromatic hydrocarbons, obtained by treating dioctahedral smectite clay minerals with an acid, wherein the activated clay has a BET specific surface area of not smaller than 250 $m^2/g$ and contains an iron component in an amount of not smaller than 2.5% by weight calculated as $Fe_2O_3$, wherein at least part of the iron component contained in the activated clay is in the form of a hydroxyl group-containing iron (III) compound.

2. An activated clay according to claim 1, wherein the activated clay has an $SiO_2/Al_2O_3$ molar ratio of from 8.0 to 17.0 and an $SiO_2/Fe_2O_3$ molar ratio of from 16.0 to 85.0.

3. An activated clay according to claim 1, wherein the activated clay is obtained by acid-treating the dioctahedral smectite clay minerals having an iron content of from 5 to 25% by weights calculated as $Fe_2O_3$.

4. An activated clay according to claim 3, wherein the activated clay has an infrared ray absorption peak at a wave number of from 890 to 860 $cm^{-1}$.

5. An activated clay according to claim 3, wherein when subjected to differential thermal analysis, the activated clay has an endothermic peak at 400 to 500° C.

6. An activated clay according to claim 1, which is obtained by acid-treating dioctahedral smectite clay minerals until they possess a BET specific area of not smaller than 250 $m^2/g$ and thereafter hydrolyzing an iron salt in the presence of the acid-treated product to precipitate an iron-component in an amount of not smaller than 0.5% by weight, calculated as $Fe_2O_3$, whereby the total $Fe_2O_3$ contents from said iron salt and any iron present in the clay, becomes not smaller than 2.5% by weight.

7. An activated clay according to claim 6, wherein at least part of the iron component is an iron salt expressed by the following formula:

$$MFe_3(SO_4)_2(OH)_6$$

wherein M is an alkali metal.

8. An activated clay according to claim 1, wherein at least part of the iron component is an iron salt expressed by the formula $MFe_3(SO_4)_2(OH)_6$, wherein M represents an alkali metal.

* * * * *